US012103868B2

(12) United States Patent
Saint-Vincent et al.

(10) Patent No.: US 12,103,868 B2
(45) Date of Patent: Oct. 1, 2024

(54) PROCESS AND APPARATUS FOR MULTI-PHASE REACTION PROCESSING OF LIQUIDS

(71) Applicant: Shockwater Solutions, LLC, New Braunfels, TX (US)

(72) Inventors: Stephen Saint-Vincent, New Braunfels, TX (US); Gerard J. Broussard, St. Martinville, LA (US)

(73) Assignee: Shockwater Solutions, LLC, New Braunfels, TX (US)

( * ) Notice: Subject to any disclaimer, the term of this patent is extended or adjusted under 35 U.S.C. 154(b) by 0 days.

(21) Appl. No.: 17/584,619

(22) Filed: Jan. 26, 2022

(65) Prior Publication Data
US 2022/0234914 A1 Jul. 28, 2022

Related U.S. Application Data

(60) Provisional application No. 63/142,235, filed on Jan. 27, 2021.

(51) Int. Cl.
*C02F 1/34* (2023.01)
*B01J 19/00* (2006.01)
(Continued)

(52) U.S. Cl.
CPC ............... *C02F 1/34* (2013.01); *B01J 19/008* (2013.01); *B01J 19/1806* (2013.01); *C02F 9/00* (2013.01); *C02F 1/004* (2013.01); *C02F 2001/007* (2013.01); *C02F 1/40* (2013.01); *C02F 1/46104* (2013.01); *C02F 1/4674* (2013.01); *C02F 2103/08* (2013.01)

(58) Field of Classification Search
CPC .... C02F 1/34; C02F 1/004; C02F 1/40; C02F 1/46104; C02F 1/4674; C02F 2001/007; C02F 2001/46142; C02F 2103/08; C02F 2209/42; C02F 9/00; B01J 19/008; B01J 19/1806
See application file for complete search history.

(56) References Cited

U.S. PATENT DOCUMENTS 706,429 A * 8/1902 Mann ...................... B01J 3/04
422/158
2,502,022 A 3/1950 Paul
(Continued)

FOREIGN PATENT DOCUMENTS

WO  WO 2012/164322 A1  12/2012

OTHER PUBLICATIONS

Petkovsek et. al. 2013 "Rotation generator of hydrodynamic cavitation for water treatment" Separation and Purification Technology 118 (2013) 415-423 (Year: 2013).*
(Continued)

*Primary Examiner* — Liam Royce
(74) *Attorney, Agent, or Firm* — Frost Brown Todd LLP

(57) ABSTRACT

Embodiments under the present disclosure include the application of an electric field in a region of liquid undergoing ultra-high shear impact, mixing and or cavitation. The co-location of electrolysis and high shear mixing and or cavitation has demonstrated the ability to cause advanced oxidation reactions and advanced reduction reactions in fluid systems such as water with both dissolved and suspended solids, and hydrocarbon with and without water emulsion.

4 Claims, 12 Drawing Sheets

(51) Int. Cl.
*B01J 19/18* (2006.01)
*C02F 1/00* (2023.01)
*C02F 1/40* (2023.01)
*C02F 1/461* (2023.01)
*C02F 1/467* (2023.01)
*C02F 9/00* (2023.01)
*C02F 103/08* (2006.01)

(56) References Cited

U.S. PATENT DOCUMENTS

| | | | |
|---|---|---|---|
| 2,623,700 A | 12/1952 | Scherer | |
| 4,042,509 A * | 8/1977 | Bowen | B01D 33/50 |
| | | | 210/205 |
| 4,269,363 A | 5/1981 | Entzmann | |
| 4,366,929 A | 1/1983 | de los Santos | |
| 5,188,090 A | 2/1993 | Griggs | |
| 6,227,193 B1 | 5/2001 | Selivanov | |
| 10,240,774 B2 | 3/2019 | Hrinda et al. | |
| 10,259,726 B2 | 4/2019 | Fraim et al. | |
| 2004/0232006 A1* | 11/2004 | Kazem | C01B 13/11 |
| | | | 205/687 |
| 2017/0165675 A1 | 6/2017 | Holl | |
| 2017/0227133 A1 | 8/2017 | Mitton | |
| 2019/0015784 A1* | 1/2019 | Cantrell | B01D 61/50 |

OTHER PUBLICATIONS

Gostisa et. al. "Performance evaluation of a novel pilot-scale pinned disc rotating generator of hydrodynamic cavitation". Ultrasonics Sonochemistry 72 (2021) 105431. (Year: 2021).*

Blagojevic et. al. 2023 "A review on rotary generators of hydrodynamic cavitation for wastewater treatment and enhancement of anaerobic digestion process". Processes 2023, 11, 514. https://doi.org/10.3390/pr11020514 (Year: 2023).*

* cited by examiner

PROCESS AND APPARATUS FOR MULTI-PHASE REACTION PROCESSING OF LIQUIDS

CROSS REFERENCE TO RELATED INFORMATION

This application claims the benefit of U.S. Provisional Patent Application No. 63/142,235, filed Jan. 27, 2021, titled "Process and Apparatus for Multi-Phase Reaction Processing of Liquids," the contents of which are hereby incorporated herein in its entirety.

TECHNICAL FIELD

The present disclosure generally relates to the field of filtration and processing of liquids.

BACKGROUND

Historically, fluid processing under high shear stress is generated under a cavitation field. The cavitation field can be created by means of hydrodynamic processes wherein a localized pressure drop and possibly turbulence are used to generate a cavitation bubble region. Other techniques to generate cavitation include through the use of acoustic pressure oscillation. Various prior art references include certain approaches to oxidation, filtration and processing, including: US Application No. 2017/0165675A1 (Holl), U.S. Pat. No. 2,502,022A (Paul), U.S. Pat. No. 2,623,700A (Scherer), U.S. Pat. No. 4,269,363A (Entzmann), U.S. Pat. No. 4,366,929A (de los Santos), U.S. Pat. No. 5,188,090A (Griggs), U.S. Pat. No. 6,227,193B1 (Selivanov), WO2012164322A1 (Fabian), U.S. Pat. No. 10,240,774B2 (Hrinda), U.S. Pat. No. 10,259,726B2 (Fraim), US Patent Application No. 2017/0227133A1 (Mitton), U.S. Pat. Nos. 5,188,090A, 10,240,774B2. Some of the prior art describes the use of counter rotating disks that are populated by features such as pins, or apertures wherein dry material is introduced and is impacted by the rotating features causing particle size reduction.

SUMMARY

One embodiment under the present disclosure comprises an apparatus for creating cavitation in a liquid treatment process. Said apparatus comprises a plurality of shafts configured to be rotated by one or more motors, the plurality of shafts configured to receive an electrical current from one or more power supplies; and a housing configured to receive the plurality of shafts therethrough at distal ends, the housing comprising an inlet for receiving influent and an outlet for discharging the influent. It can further comprise a plurality of disks within the housing, each of the plurality of disks connected to one of the plurality of shafts and configured to be rotated thereby, the plurality of disks configured to face each other and define an inner and outer volume within the housing such that influent may pass between the inner and outer volumes, each of the plurality of disks comprising one or more extensions extending from the respective disk toward the other disk. The apparatus can be characterized in that when the plurality of shafts receive the electrical current an electrical potential is created between the plurality of disks such that rotating the disks creates cavitation in the influent.

Another embodiment under the present disclosure can comprise a water treatment system for treating influent. The system can comprise a gravity separator configured to cause high-density solids to fall out of suspension from the influent and low-density materials to coalesce and break from the influent; a particle strainer downstream of the gravity separator and configured strain solids out of the influent; and a pump downstream of the particle strainer configured to provide sufficient energy to push the influent through the water treatment system. It can further comprise a multi-phase reaction (MPR) processing system downstream of the pump, the MPR processing system comprising; a plurality of shafts configured to be rotated by one or more motors, the plurality of shafts configured to receive an electrical current from one or more power supplies; a housing configured to receive the plurality of shafts therethrough at distal ends, the housing comprising an inlet configured to receive the influent from the pump and an outlet for discharging the influent; and a plurality of disks within the housing, each of the plurality of disks connected to one of the plurality of shafts and configured to be rotated thereby, the plurality of disks configured to face each other and define an inner and outer volume within the housing such that the influent may pass between the inner and outer volumes, each of the plurality of disks comprising one or more extensions extending from the respective disk toward the other disk; wherein when the plurality of shafts receive the electrical current an electrical potential is created between the plurality of disks such that rotating the disks creates cavitation in the influent. The system can further comprise an electro-chemical cell downstream of the MPR processing system and configured to provide a catalytic reaction within the influent to convert chlorine ions into free chorine and chlorine dioxide; and a filtration system downstream of the electro-chemical cell configured to remove suspended solids from the influent.

Another embodiment under the present disclosure comprises a method of causing cavitation in a liquid treatment system. The method comprises receiving a flow of influent at an inlet to a housing, the housing containing two or more rotating wheels, the two or more rotating wheels defining an inner volume and an outer volume and configured to allow influent to flow between the inner and outer volumes, and further configured to carry electrical charge from outside the housing; rotating the two or more rotating wheels; applying an electrical current to the two or more rotating wheels so as to create an electric potential between the two or more rotating wheels and cause cavitation in the influent; and directing the influent out of the housing through an outlet.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

BRIEF DESCRIPTION OF THE DRAWINGS

For a more complete understanding of the present disclosure, reference is now made to the following descriptions taken in conjunction with the accompanying drawings, in which.

DETAILED DESCRIPTION

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed embodiments. In addition, the terminology used herein is for the purpose of describing the embodiments and is not necessarily intended to limit the scope of the claimed embodiments.

Embodiments under the present disclosure include methods and apparatuses for liquid processing for inducing a state of high shear stress, controlled cavitation and mixing by means of turbulent interaction of opposing liquid flows, while simultaneously imposing an electric field and magnetic field in the region of cavitation and high shear stress. This disclosure includes embodiments for the application of multiple physical mechanical and chemical processes to liquid streams to cause advanced oxidation reaction to the liquid under treatment. Prior art systems were usually not intended for the processing of liquids, much less the introduction of cavitation and or high shear mixing in a liquid. Furthermore, in prior art solutions, the relative energy density is too low to be of practical large-scale industrial processing. There is an ever increasing need to treat fluid streams to cause preferential reactions such as: particle size reduction, advanced oxidation, cellular lysing, long chain molecule cracking and other physical chemistry reactions.

Embodiments under the present disclosure include the application of an electric field in a region of liquid undergoing ultra-high shear impact, mixing and or cavitation. The co-location of electrolysis and high shear mixing and or cavitation has demonstrated the ability to cause advanced oxidation reactions and advanced reduction reactions in fluid systems such as water with both dissolved and suspended solids and hydrocarbons, with and without water emulsion. Embodiments of multi-phase reaction processing in the present disclosure are effective in creating an environment where advanced oxidation processes (AOPs) are created within a water stream. The creation of AOP can be mechanically created within the reactor without the addition of other chemicals. Advanced oxidation processes are useful for the destruction of organic compounds, and under ideal circumstances, substantial removal of Total Dissolved Solids (TDS) is also realized.

Figure 1:
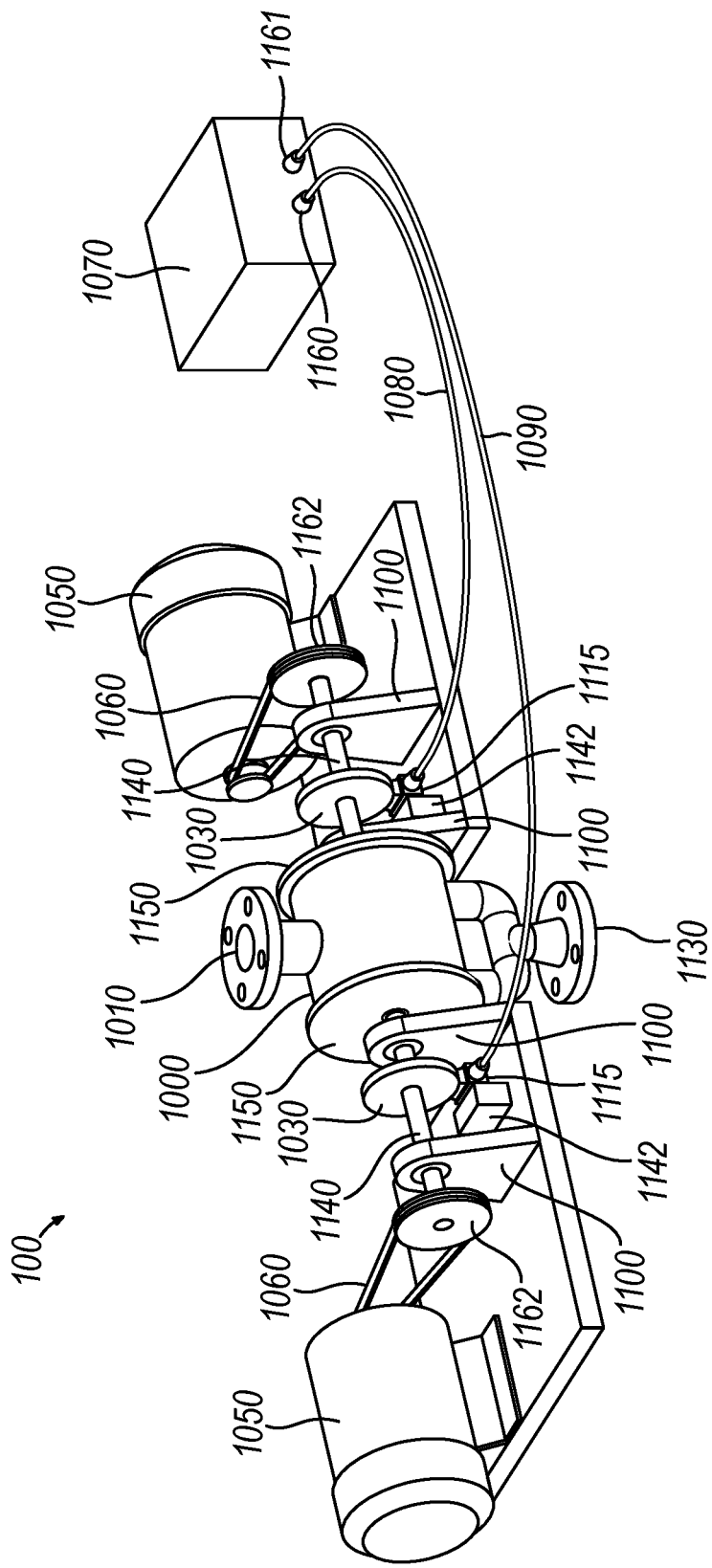
FIG. 1 shows an embodiment of a multi-phase reaction processing system under the present disclosure.

FIG. 1 shows an embodiment of a multi-phase reaction liquid processing system 100 under the present disclosure. A reactor housing 1000 is generally in the shape of a cylinder and has inlet port 1130 through which liquid/influent is introduced into the reactor housing 1000 and exhausted through the outlet port 1010. System 100 can comprise a portion of a water treatment facility, a car wash, a building water treatment system, or other liquid or water treatment systems or machines. Reactor housing 1000 has side plates 1150 on either side of the reactor housing 1000 to make a sealed internal volume within the reactor housing 1000. Shafts 1140 penetrate the side plates 1150 and can rotate the internal cavitation elements (see e.g., FIG. 2). Shafts 1140 can be supported by one or more shaft supports 1100 which can couple to a stationary surface while allowing rotation of shafts 1140. Electrically conductive slip rings 1030 are rotationally attached to the shafts 1140. An electrically conductive brush assembly 1115 is preferably in electrical communication with the shafts 1140 via conductive slip rings 1030. Shafts 1140 are preferably in electrical isolation from motors 1050, reactor housing 1000, and side plates 1150. A rotational force can be provided by a prime mover such as motors 1050 to the shafts 1140 via power disks 1162 which can be driven by motors 1050 and transmit the power to the rotation of shafts 1140. Shafts 1140 can be coupled to the motor 1050 by any means that permits alignment of the motor 1050 to shafts 1140. In this example pulleys 1060 are mounted to shafts 1140 and motors 1050. Motors 1050 may also be mounted so as to permit direct alignment with shaft 1140, such as with either a ridged shaft coupler or flexible shaft coupler. Regardless of the means of transmitting rotational torque from motors 1050 to the shaft 1140, the coupler can provide means of electrically isolating the shafts 1140 from motors 1050. The prime mover is not limited to an electric motor but can comprise any means that can provide rotational torque to the shaft 1140.

Those skilled in the art will recognize that shafts 1140 may be electrically isolated from all the surrounding and supporting structure except for the single electrically conductive path to a power supply 1070, such as via brush assemblies 1115 and conductive slip rings 1030. Power supply 1070 with electrical output terminals 1160, 1161 can be in electrical communication with brush assembly 1115 by means of electrical conductors 1080, 1090. Output terminals 1160, 1161 may have a constant voltage difference or a time varying voltage difference, causing an electrical current to flow from one output terminal 1160 to the other 1161 (or vice versa). Conductors 1080, 1090 can be sized to the ampacity requirement of the electrical circuit. Supporting structures 1142 can help hold brush assemblies 1115 in place.

Figure 2A:
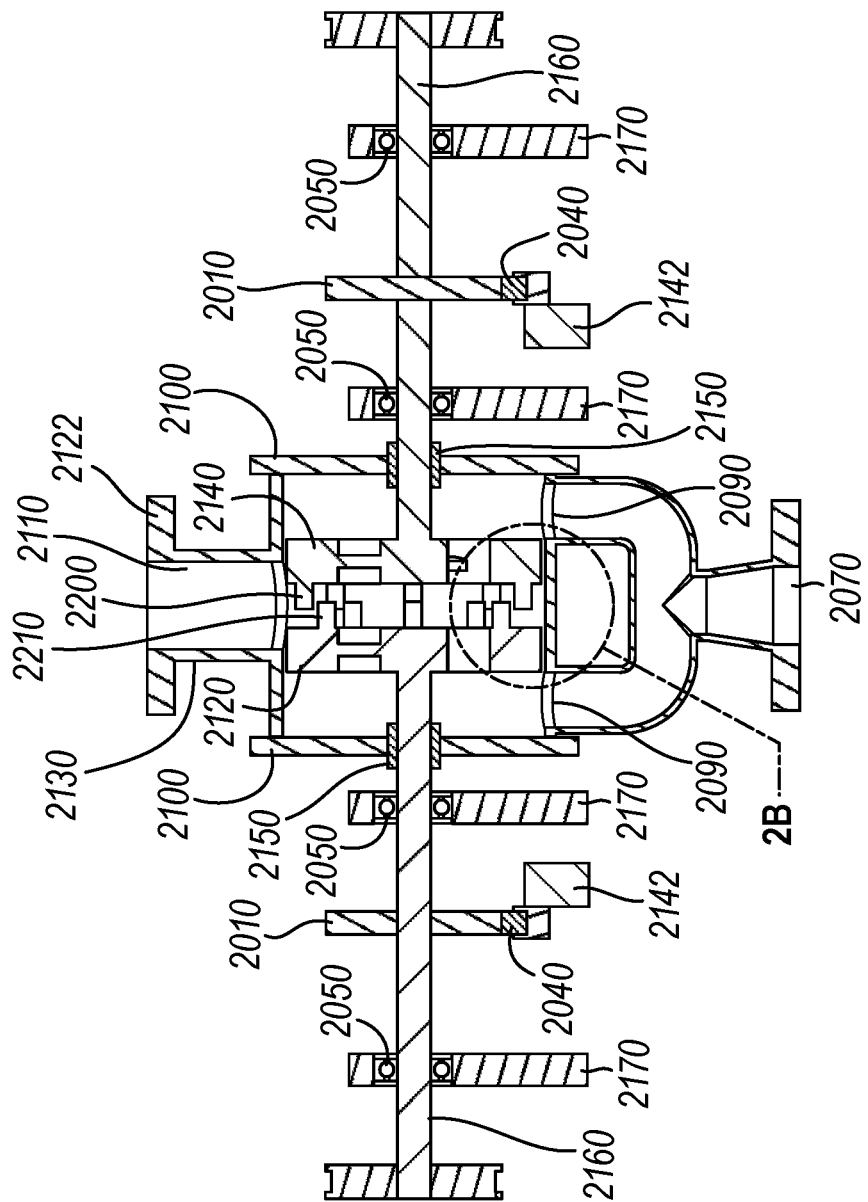
FIGS. 2A-2B are cross sectional views of a multi-phase reaction processing system embodiment under the present disclosure.
Figure 2B:
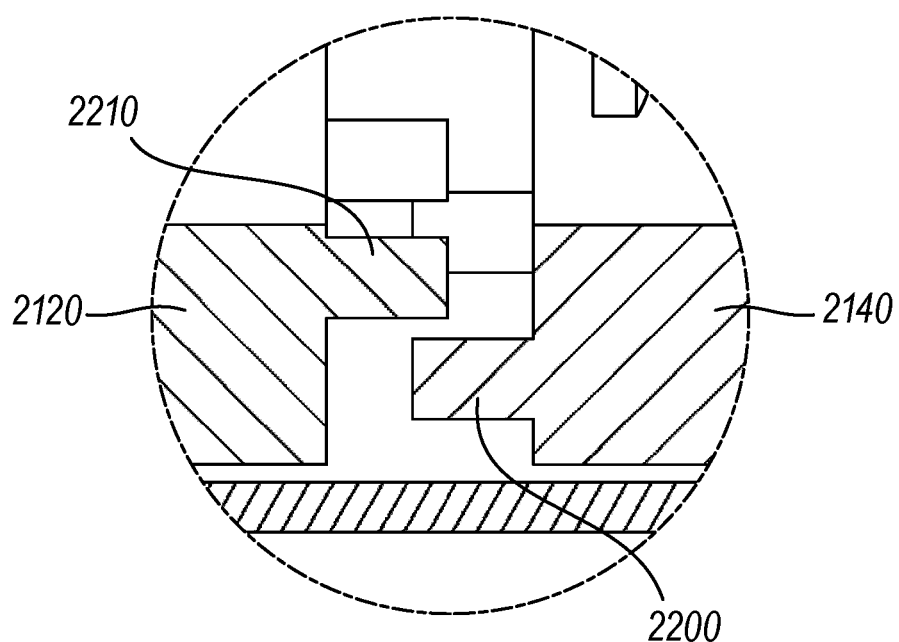

FIG. 2 is a cross sectional view of an embodiment of the reactor housing 2130 (similar to reactor housing 1150 of FIG. 1) showing the internal structure. The pair of rotating disks 2120, 2140 are disposed within the reactor housing 2130 with a common axis of rotation and the axis of rotation is coincident with the axis of the cylindrical reactor housing 2130. Side plates 2100 are preferably fixedly attached to the reactor housing 2130 to form a leak proof seal, preventing influent from escaping the volume of the reactor housing 2130 and side plates 2000. The influent enters the reactor housing 2130 through an inlet flange 2070 which is fluidly connected to inlet apertures 2090. Rotating disks 2120, 2140 have openings, apertures, other paths or other means by which the liquid under process is able to transfer from the outer volume defined between the side plates 2100 and the proximal faces of rotating disks 2140, 2100 to the inner volume in between the rotating disks 2140, 2100. Exhaust/outlet aperture 2110 in the reactor housing 2130 provides means of the liquid under process to be expelled from the reactor housing 2130. A means of connecting the exhaust aperture 2110 to fluid conduits is provided by outlet flange 2122.

Shaft seal 2150 provides a fluid tight seal between the stationary side plate 2100 and rotating shafts 2160. The preferred seal type is that of a Silicon Carbide stationary seal and Silicon Carbide rotating face. Those skilled in the art will recognize that other materials and seal types may be used. However, the seal used preferably provides electrical isolation between the rotating shafts 2160 and stationary side plate 2100.

Bearings 2050 can provide radial positioning of rotating shafts 2160 with respect to the centerline axis of the reactor housing 2130 and side plates 2100. Bearings 2050 are mounted in a single or plurality of bearing supports 2170. Bearing supports 2170 can be fixedly attached to any support structure or stationary surface that provides concentric radial alignment of the rotating disks 2120, 2140 with the side plates 2100 and reactor housing 2130. Bearings 2050 are preferably constructed in a manner to provide electrical isolation between rotating shafts 2160 and the bearing support 2170. Common means of providing electrical isolation can be by means of use of hybrid bearings comprising Silicon Carbide ball bearings or use of an electrically isolating coating on either the outer or inner shell of the bearing.

A means of inducing an electric voltage potential between the rotating disks 2120, 2140 can be provided by means of an electrically conducting circuit where rotating slip rings 2010 are fixedly attached to the rotating shafts 2160. Rotating slip rings 2010 are in electrical communication with the rotating shaft 2160. Brushes 2040 can be fixedly attached to stationary supporting structures 2142. Supporting structures 2142 can be located aside, below, or otherwise attached to brushes 2040 to provide a stationary support to hold brushes 2040 in place. Supporting structures 2142 can be attached to, or comprise, a portion of a plate or another stationary surface within a larger system, such as the same stationary surface attached to bearing supports 2170. Brushes 2040 provide a means of transferring electrical current from an electrical conductor to the rotating slip ring 2010. Brushes 2040 can be constructed of a carbon material with metallic conducting particles dispersed within the carbon. Those skilled in the art will recognize that the composition of the brushes 2040 may be optimized to minimize friction between the brush 2040 face in contact with the rotating slip rings 2010 while minimizing electrical resistance.

Proximal protuberance 2210 extends from the face of rotating disk 2100 facing distal protuberance 2200 extending from the face of rotating disk 2140. Proximal protuberance 2210 and distal protuberance 2200 are mounted on the facing surfaces of the rotating disks 2120, 2140. The heights of proximal protuberance 2210 and distal protuberance 2200 preferably extend to a distance that exceeds the center plane distance between the inner faces of rotating disks 2120, 2140. The radial distance of the proximal protuberance 2210 from the axis of rotation of rotating shaft 2160 is less than the radial distance of the distal protuberance 2200 from the same axis of rotation. The difference between the proximal protuberance 2210 and distal protuberance 2200 radii is such that they do not interfere with each other in their respective rotation, while allowing overlap in the axial plane. Those skilled in the art will recognize that the gap between the proximal protuberance 2210 and distal protuberance 2200 can be optimized for reaction intensity imparted to the liquid under process. Those skilled in the art will recognize that a liquid under process can provide an electrical conduction path between the rotating disk 2100 and rotating disk 2140. An electrical potential is established between the rotating disks 2120, 2140 by an external power supply (such as power supply 1070 of FIG. 1). Water or other influent with characteristically low conductance (e.g., low total dissolved solids) can become conductive in the presence of cavitation. Those skilled in the art will recognize that the gap between the proximal protuberance 2210 and distal protuberance 2200 and the rotational velocity of the rotating disks 2120, 2140 can be optimized to maximize the advanced oxidation reaction or other physical chemistry results. The height of the protuberances 2210, 2200 is less than the distance between the two disks. The radial dimension difference permits free passage of the protuberances 2210, 2200. Those skilled in the art will recognize that the geometry of the protuberance may be of any shape, including cylindrical, rectangular, extruded polygon, and is not limited to the aforementioned examples.

The rotating disks 2120, 2140 can be housed within a cylindrical reactor housing 2100 whose axis is co-axial with the central axis of the rotating disks 2120, 2140. The radial dimension of the cylindrical reactor housing 2100 is larger than that of the rotating disks 2120, 2140. The difference in the radial distance between the reactor housing 2100 and the rotating disks 2120, 2140 can be sufficiently small so that a pressure difference between the volume external to the rotating disks 2120, 2140 and the volume interior to the rotating disks 2120, 2140 will cause a leakage path between the internal and external volumes. Those skilled in the art will recognize that the pressure difference, clearance gap between the distal diameter of the rotating disks 2120, 2140 and the reactor housing 2100 can be adjusted to control the leakage and re-circulation rate of the process fluid.

Figure 3B:
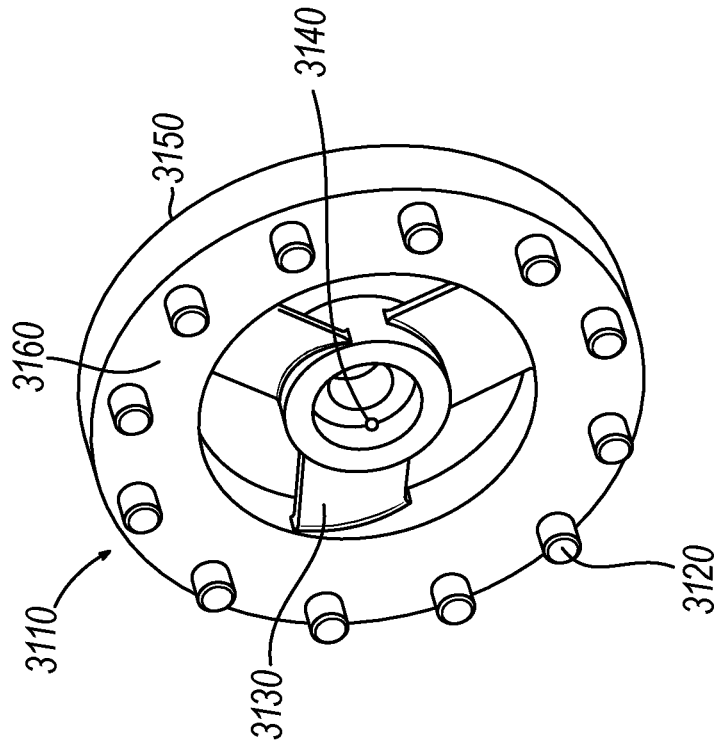
FIGS. 3A-3B are views of rotating disk and protuberances embodiments under the present disclosure.
Figure 3A:
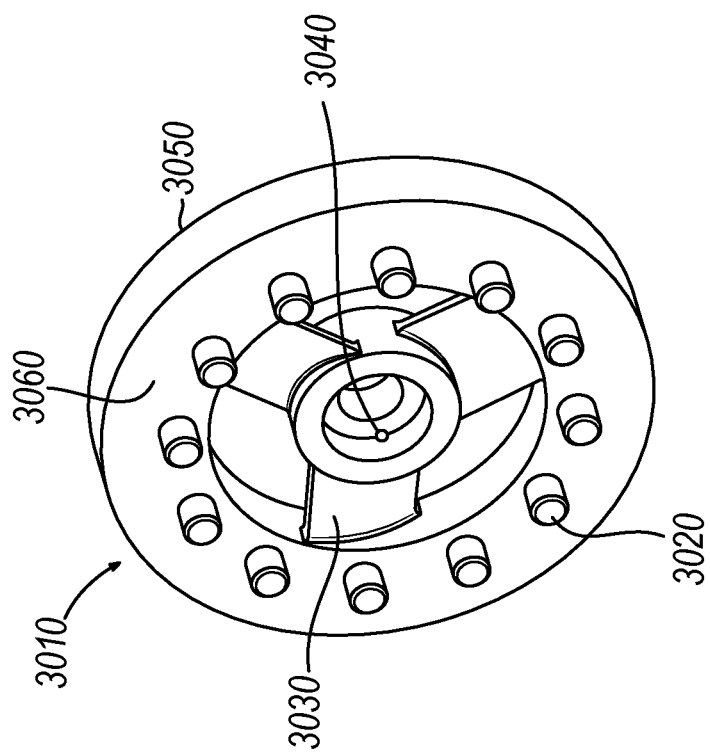

An embodiment of a rotating disk 3010 showing the proximal protuberance 3020, is shown in FIG. 3A. Proximal protuberance 3020 is distributed around the central axis of rotation. Rotating disk 3010 preferably comprises a means of attachment to a shaft, such as via hub 3040. FIG. 3B shows an embodiment of rotating disk 3110 with distal protuberance 3120. Proximal protuberance 3120 is distributed around the central axis of rotation. Rotating disk 3110 preferably comprises a means of attachment to a shaft, such as via hub 3140. A series of radially oriented spokes 3030, 3130 can fix the outer rim of the rotating disk 3010, 3110 to the hub 3040, 3140. Spokes 3030, 3130 may be constructed in a manner that imparts a force on the liquid under process to propel from outer face 3050, 3150 to inner face 3060, 3160. For example, spokes 3030, 3130 may be constructed in such a manner as to provide a pressure difference between the fluidly connected space outside paired rotating disks 3010, 3110 and a volume between paired counter rotating disks 3010, 3110. Spokes 3030, 3130 can be angled, beveled, or otherwise shaped (similar to ceiling fans) so as to impart forces to the liquid under process.

Figure 4:
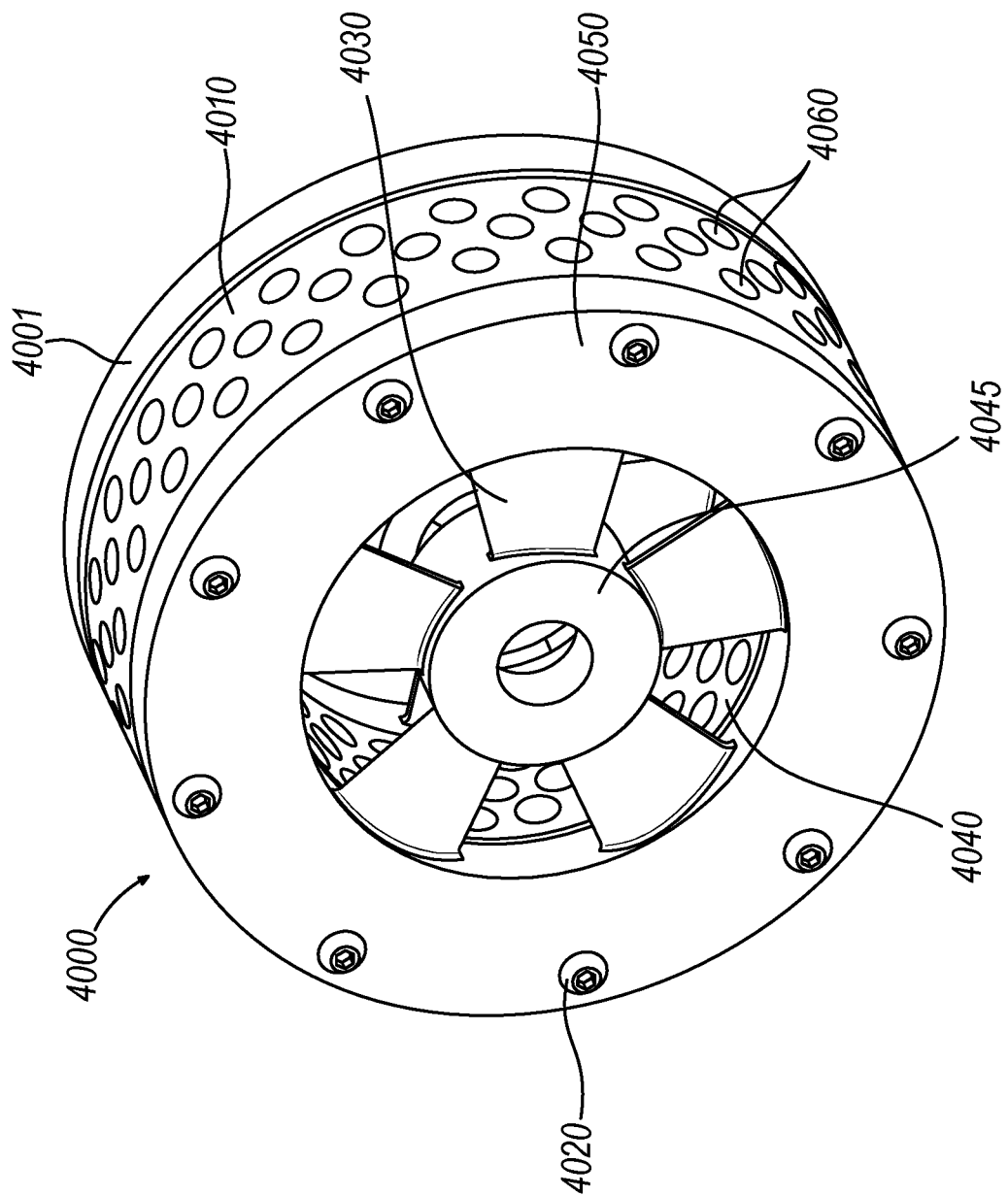
FIG. 4 shows an embodiment of joined rotating disks under the present disclosure.

Alternative rotating assembly embodiments are shown in FIGS. 4-6. In the embodiment shown in FIG. 4, a pair of counter rotating wheels 4000, 4001 are mirrored about a central plane. Between rotating wheels 4000, 4001 is an inner rim or hoop 4040 with a distal diameter that is less than a second outer rim 4010 whose proximal diameter is greater than the inner rim 4040. The inner rim 4040 can be fixedly attached to one of rotating wheels 4000, 4001. The outer rim 4010 can be fixedly attached to the other of rotating wheels 4000, 4001. The axial length of each rim 4010, 4040 slightly smaller than the parallel distance between the two rotating wheels 4000, 4001. Attachment can be by means of mechanical fasteners 4020, or other appropriate means (screws, bolts, clips, glue, adhesives, or others). Hub 4045 is connected to an outer edge 4050 by means of one or more spokes 4030. Rotating wheels 4000, 4001 are preferably very similar, if not identical, to each other. Those skilled in the art will recognize that differences between rotating wheels 4000, 4001 can be made to accommodate the attachment of either the outer rim 4010 and inner rim 4040, or other variations not limited to attachment method. Outer rim 4010 and inner rim 4040 can comprise a plurality of radial apertures 4060. Apertures 4060 fluidly connect the proximal and distal faces of each rim 4010, 4040. Those skilled in the art will recognize that the geometry of the apertures 4060 may be a straight walled cylinder, conical, polygonal or any other shape and is not limited to the aforementioned examples. The radial spacing of each aperture 4060 may be periodic, non-periodic, or a periodic arrangement of any array. Rims 4010, 4040 can carry electric charge, similar to wheels 4000, 4001 or protuberances 3020, 3120 as shown in FIGS. 3A-3B.

Figures 5A, 5B:
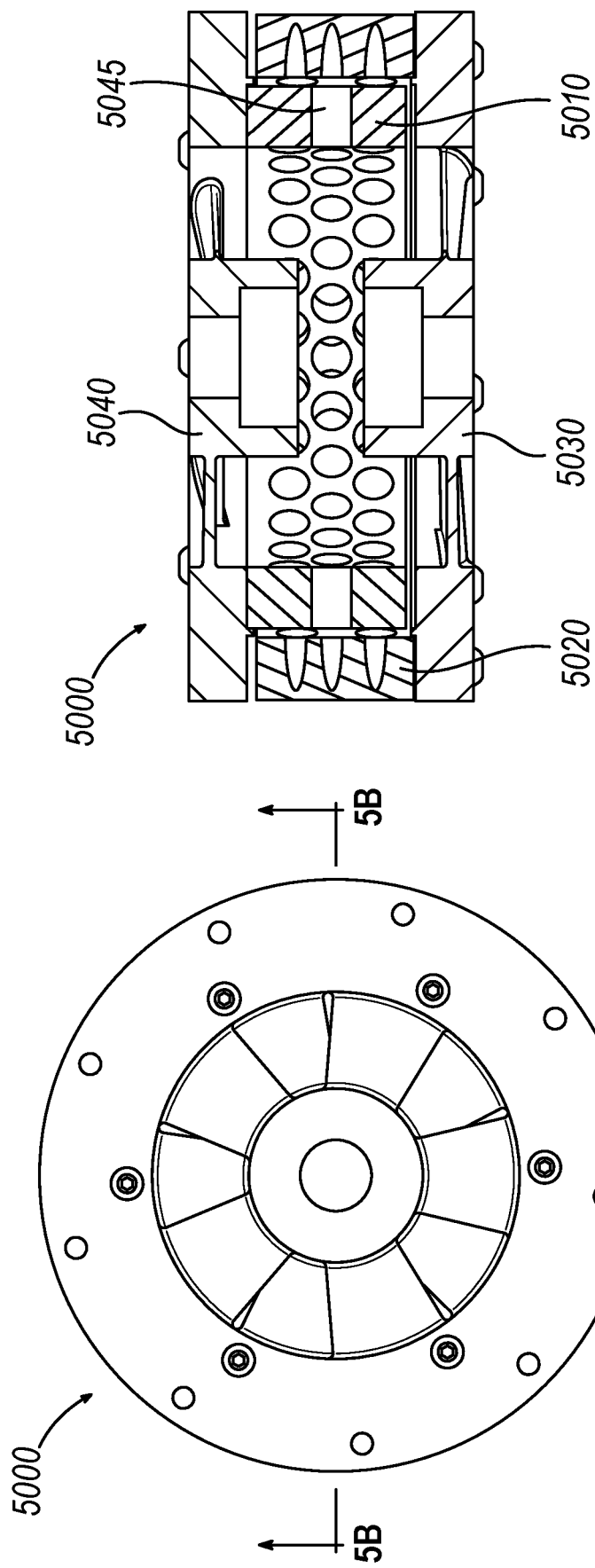
FIGS. 5A-5B are cross sectional views of rotating disk embodiments under the present disclosure.

Cut-away and side views of an embodiment of a rotating wheel assembly 5000 are shown in FIGS. 5A and 5B. A side section view along plane B-B, shown in FIG. 5B shows the outer rim 5020 mechanically fastened to rotor wheel 5030. A clearance gap is preferably maintained between the outer rim 5020 and rotor wheel 5040 and the inner rim 5010. Inner rim 5010 is mechanically fastened to rotor wheel 5040. A clearance gap is preferably maintained between the inner rim 5010 and rotor wheel 5030. Apertures 5045 can be seen on inner rim 5010.

Figure 6B:
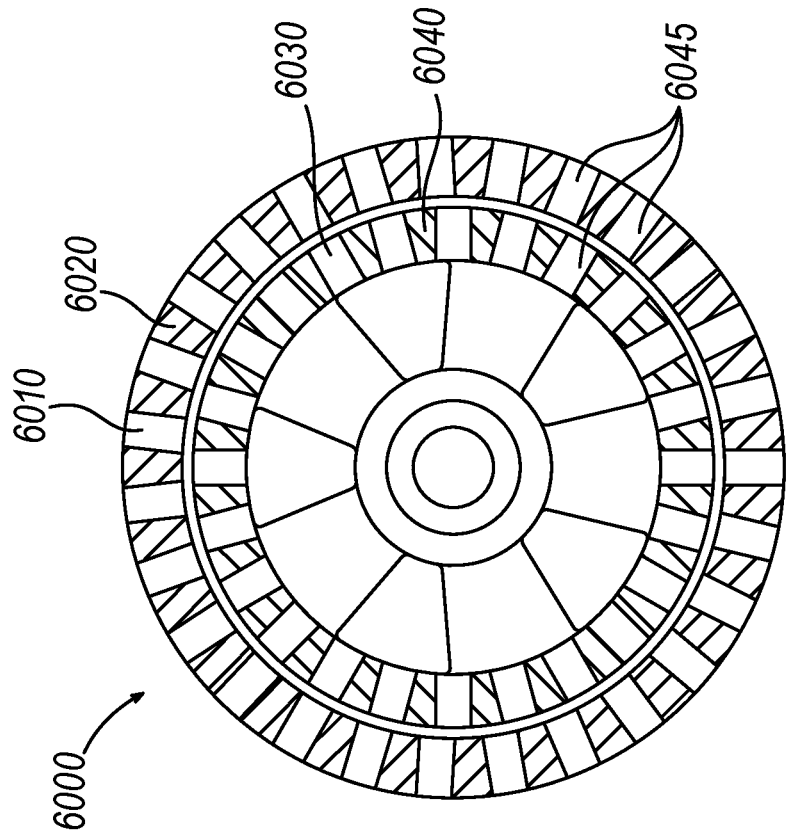
FIGS. 6A-6B are cross sectional views of rotating disk embodiments under the present disclosure.
Figure 6A:
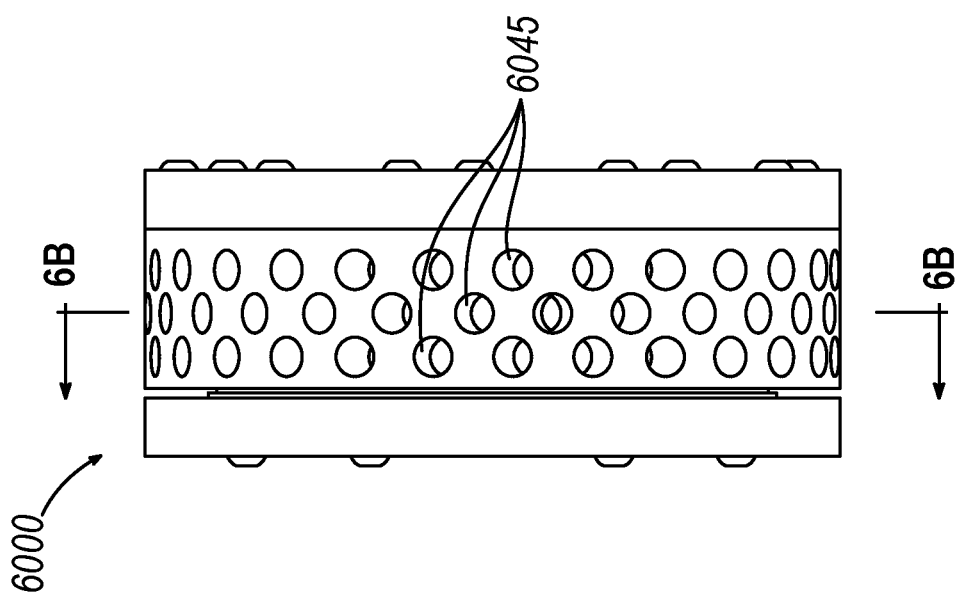

An end view elevation of an embodiment of a rotating wheel assembly 6000 is shown in FIGS. 6A and 6B (with a cross section A-A view). A plurality of apertures 6045 can be set in an array, oriented along the radial dimension of both the inner rim 6040 and outer rim 6020. The aperture 6045 can be evenly distributed around the circumference of both the inner rim 6040 and outer rim 6020. A plurality of apertures 6045 can be distributed along the central axis of both the inner rim 6040 and outer rim 6020. The number of apertures 6045 on the inner rim 6040 and outer rim 6020 may be different. The geometry of the apertures 6045 on the inner rim 6040 and outer rim 6020 may be different, and the apertures 6045 may not line up between the inner rim 6040 and outer rim 6020.

Other embodiments under the present disclosure can comprise providing an electrical potential in the form of any constant voltage or time variant voltage between two counter rotating elements, such as rotating disks 2120, 2140 of FIG. 2. The liquid under process in a multi-phase reactor, such as described herein, can provide an electrical conduction pathway between the rotating disks 2120, 2140, protuberances 2200, 2210, or apertures 2045, or inner and outer rims, or other components. Additionally, the counter rotating disks 2120, 2140 and their axles are preferably electrically isolated from the reactor housing 2100, bearing support elements, seals, shaft coupling or any other electrical conduction pathway that would provide a low resistance pathway other than that between the two counter rotating disks 2120, 2140.

A mixed metal oxide (MMO) coating containing metallic elements of Ruthenium, Tantalum, Iridium, Platinum, and/or other metals may be applied to either or both of the rotating elements (such as rotating disks 2120, 2140) in certain embodiments of the present disclosure. Embodiments of the composition of the MMO may comprise any ratio of the elements Ruthenium, Tantalum, Iridium and/or Platinum. Other MMOs are possible.

An array of permanent or temporary electromagnetic elements may be disposed on the distal surface of the reactor housing (such as reactor housing 2100 of FIG. 2), wherein a permanent magnetic flux or a time variant magnetic flux is propagated into the interior region of the reactor housing 2100, preferably in the cavitation zone formed by the perturbances 2200, 2210 on either disk 2120, 2140 or the inner and outer rims 4010, 4040 of FIG. 4.

Figure 7:
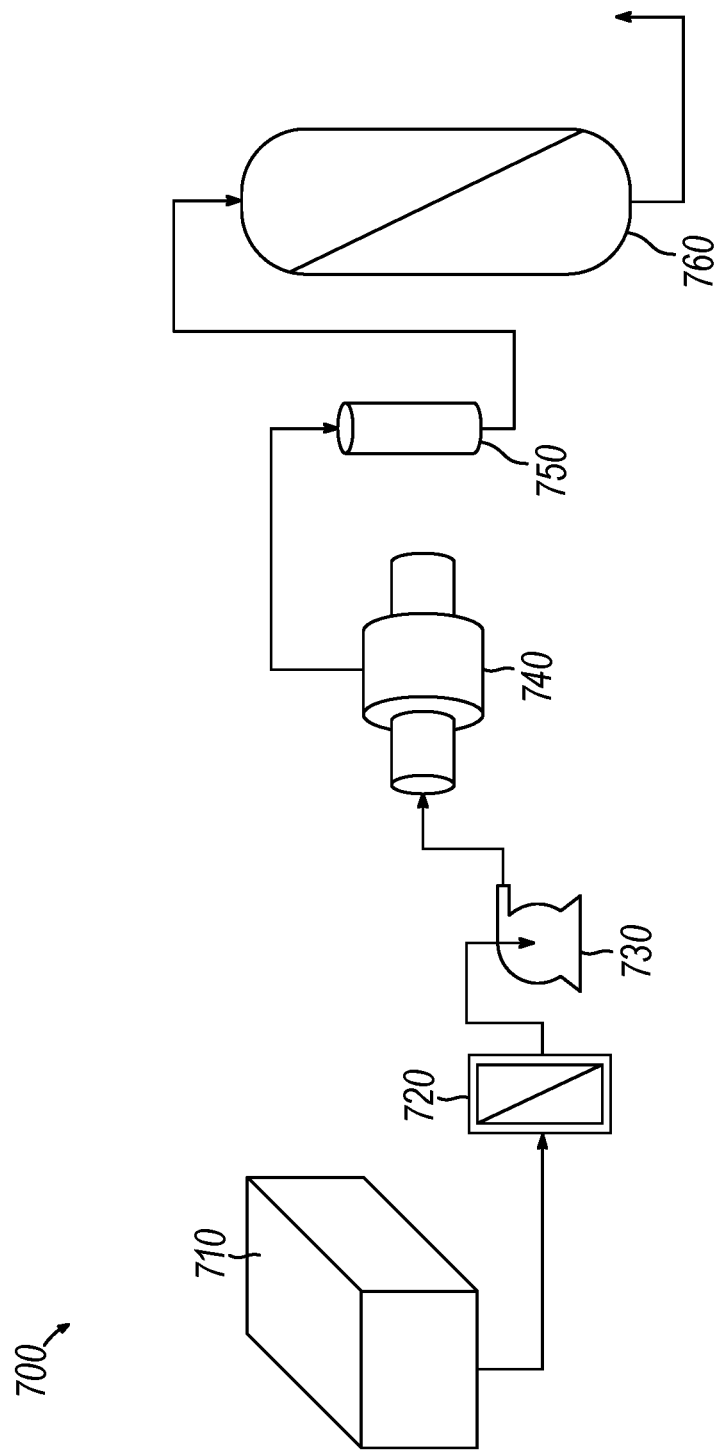
FIG. 7 shows a liquid treatment system embodiment under the present disclosure.

The multi-phase reaction (MPR) processing systems, apparatuses and methods described in the present disclosure can be integrated into larger water treatment systems and techniques. FIG. 7 shows one embodiment of a water treatment system 700. Influent (water under process), is introduced to a gravity separator 710 to cause separation of high density solids (clays, metals, grit, etc.) to fall out of suspension and low density materials (oil, grease, fats, etc.) to coalesce and break from the influent water. Withdrawing the water under treatment from the separator 710 after high- and low-density materials are removed, the water is passed through a particle strainer 720 to prevent solids (e.g., larger than 100 microns) from entering and/or continuing the process. The strained water is then pulled into the suction of a pump 730 that provides sufficient energy to push the water under process through the system 700. Energized water discharged from the pump 730 is then feed to the MPR 740 (such as described in FIGS. 1-6B of the present disclosure) wherein the water is subjected to the mixing and controlled cavitation processes within the reactor. After passing through the MPR 740, the water is then fed to an electro-chemical cell 750. The electro-chemical cell 750 can provide a catalytic reaction to convert chlorine ions into free chlorine and chlorine dioxide. Cations such as Iron and Aluminum are positively charged and can enable Fenton type reactions. Following the electro-chemical cell 750, the water is passed through a filtration system 760 to remove suspended solids. The filtration system 760 can be of any type whether cartridge, media or membrane. One embodiment is a glass bead type such as the Waterco™ Pearl 0.6-0.8 mm glass sphere. Other filtration media, such as ceramic membrane (which offer 1 nano meter—1,000 nano meter filtration), has also shown removal of cations post MPR 740 and electro-chemical cell 750. Additional filtration media such as reverse osmosis, ion exchange, and other membrane filtration media can be applied as well.

Figure 8:
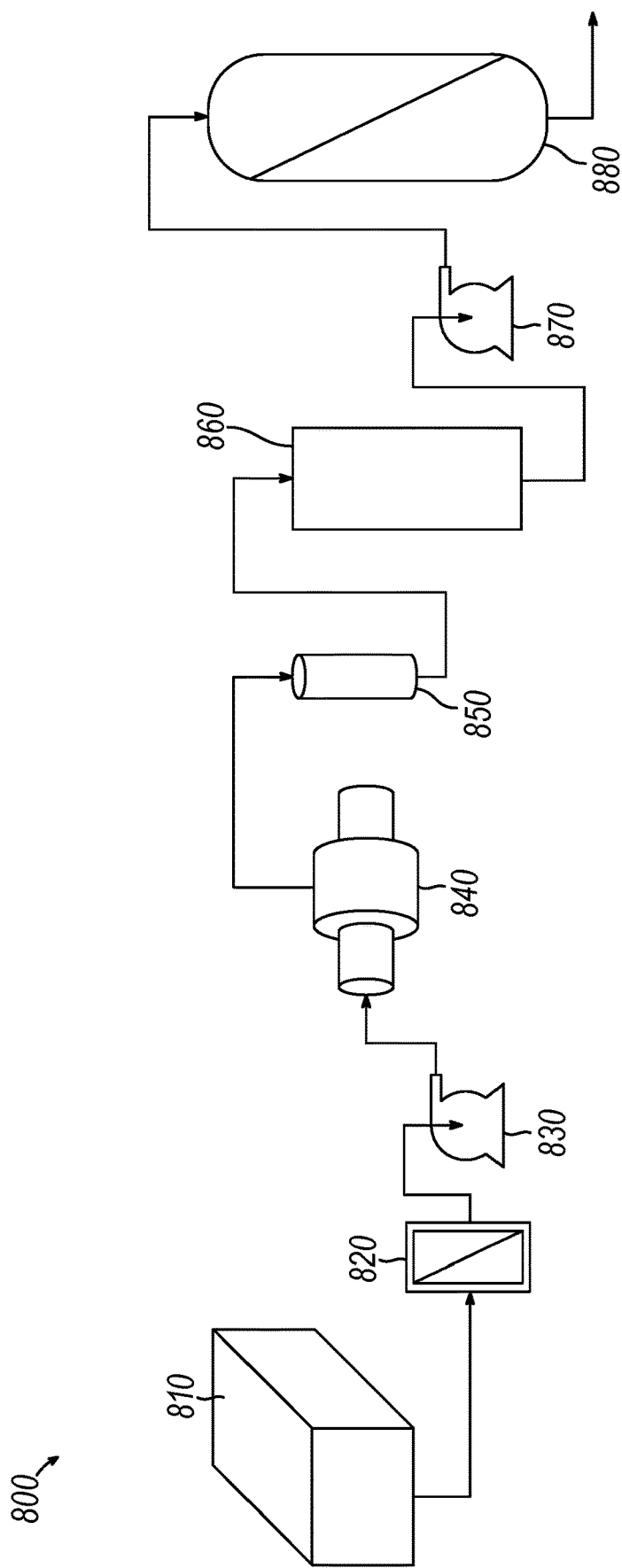
FIG. 8 shows a liquid treatment system embodiment under the present disclosure.

An alternative embodiment of a water treatment system 800, in FIG. 8, includes the introduction of a holding tank 860. Similar to embodiment 700, water under process can proceed from a separator 810, to particle strainer 820, to pump 830, to MPR 840, to electro-chemical cell 850. Holding tank 860 can receive water under process from electro-chemical cell 850. Holding tank 860 is operated at low pressure or atmospheric pressure. A transfer pump 870 suction line is fluidly connected to the holding tank 860 and the discharge line is to the filtration system 880. The high pressure of the transfer pump 870 can energize the fluid under process to pass through a filtration system 880. Those skilled in the art will recognize that various means can be used to measure the level of the fluid in the holding tank 860 to derive a control signal to control the flow rate into the holding tank 860 or withdrawn from the holding tank 860. Possible means include flow sensors, optical sensors, level sensors, pressure sensors, and other components for measuring the level.

Figure 9:
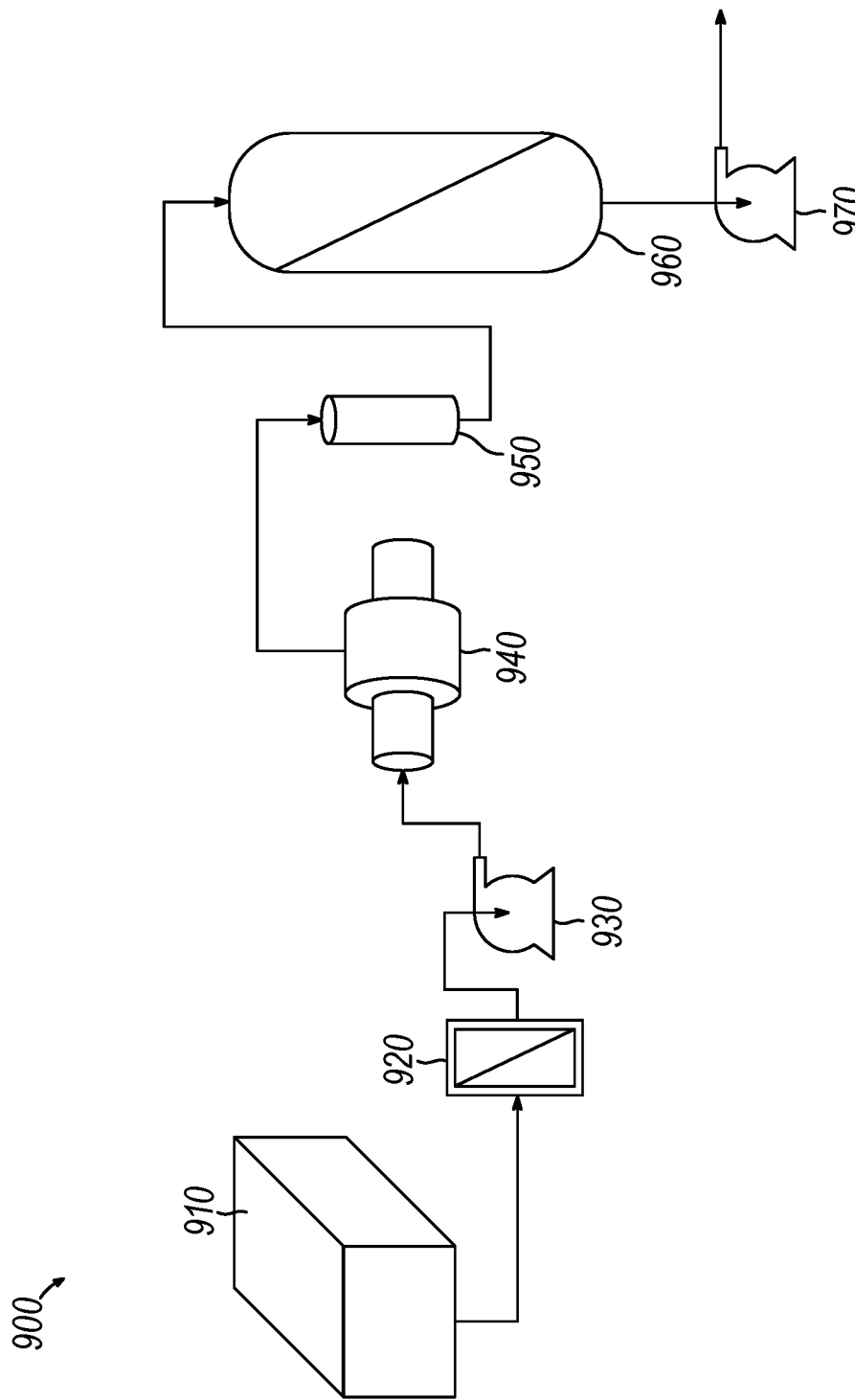
FIG. 9 shows a liquid treatment system embodiment under the present disclosure.

An alternative embodiment of a water treatment system 900 is shown in FIG. 9. Similar to embodiment 700, water under process can proceed from a separator 910, to particle strainer 920, to pump 930, to MPR 940, to electro-chemical cell 950, to filtration system 960. Filtration system 960 can comprise, e.g., a high flux ceramic membrane filter, and can be held at low to atmospheric pressure. A transfer pump 970 suction line is fluidly connected to the discharge of the filtration system 960, permitting filtered fluid to be drawn through the ceramic membrane into the pump 970. Various means can be used to measure the level of the fluid in the holding tank, transfer pump suction line pressure, and other control signal inputs to derive a control signal to control the flow rate into the holding tank and/or out of the holding tank. Possible means include flow sensors, level sensors, optical sensors, pressure sensors, and others. Pump 770 can direct water elsewhere in a system, for use by users, for use in a spray, such as in a carwash, or elsewhere. Any of systems 700, 800, 900 can comprise at least a portion of a desalination system.

Figure 10:
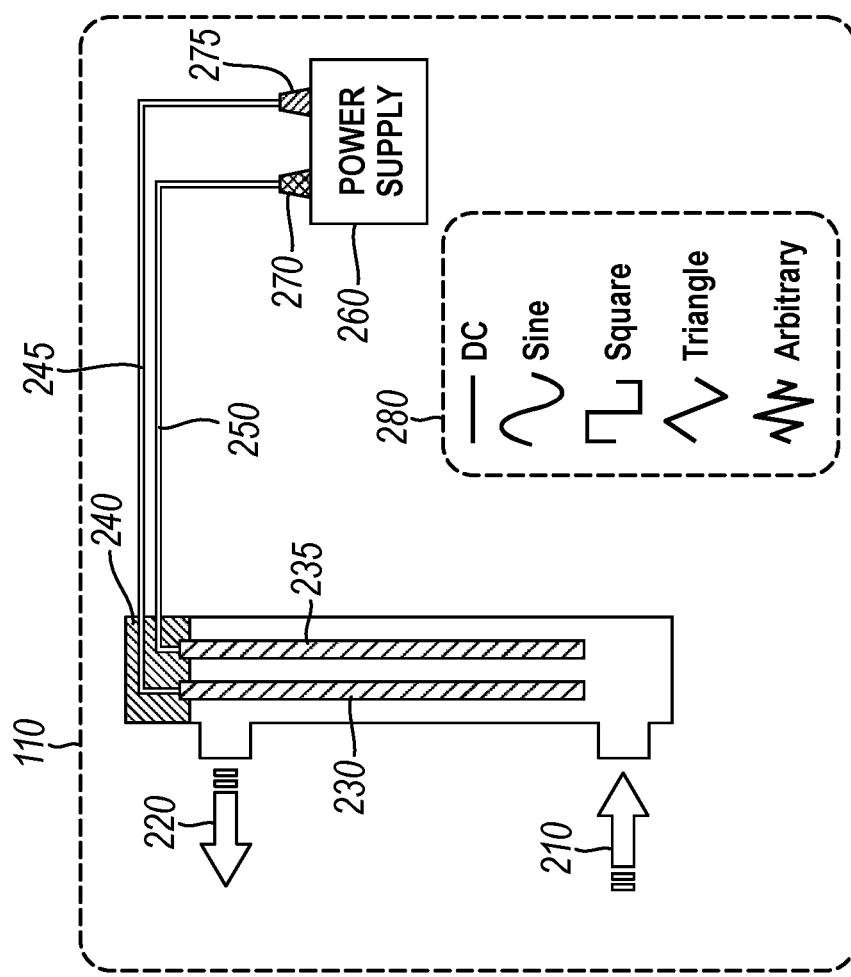
FIG. 10 shows an electro-chemical cell embodiment under the present disclosure.

An embodiment of an electro-chemical cell 1110, such as shown in FIGS. 7-9, is shown in FIG. 10. The liquid under process enters the electro-chemical cell 1110 through a port 1210. The liquid under process is passed by electrodes 1230, 1235. Electrodes 1230, 1235 can comprise an even plurality of electrodes, each pair forming a cathode and anode circuit. Electrodes 1230, 1235 are affixed to electro-chemical cell 1110 by means of support 1240 comprised of a di-electric material. Electrically conductive conduits 1250, 1255 connect to electronic power supply 1260. Electrodes 1230, 1235 are in electrical communication with output terminals 1270, 1275 of power supply 1260. An electrical voltage potential is established between output terminals 1270, 1275. Voltage potential 280 can be a time invariant signal (DC), or a time variant signal such as sine, square, triangle, or any arbitrary waveform. The time rate of change can vary, but in a preferred embodiment may be zero (0) to greater than 1 Volt per Micro-Second. Electrodes 1230, 1235 preferably comprise Titanium and Titanium coated with Mixed Metal Oxides (MMO) such as those containing Iridium, Platinum and Ruthenium. Those skilled in the art will recognize that other electrically conductive materials can be utilized, even electrically conductive polymers. The liquid under process can provide the electrical conduit circuit between the electrodes 1230, 1235 (anode and cathode).

Figure 11:
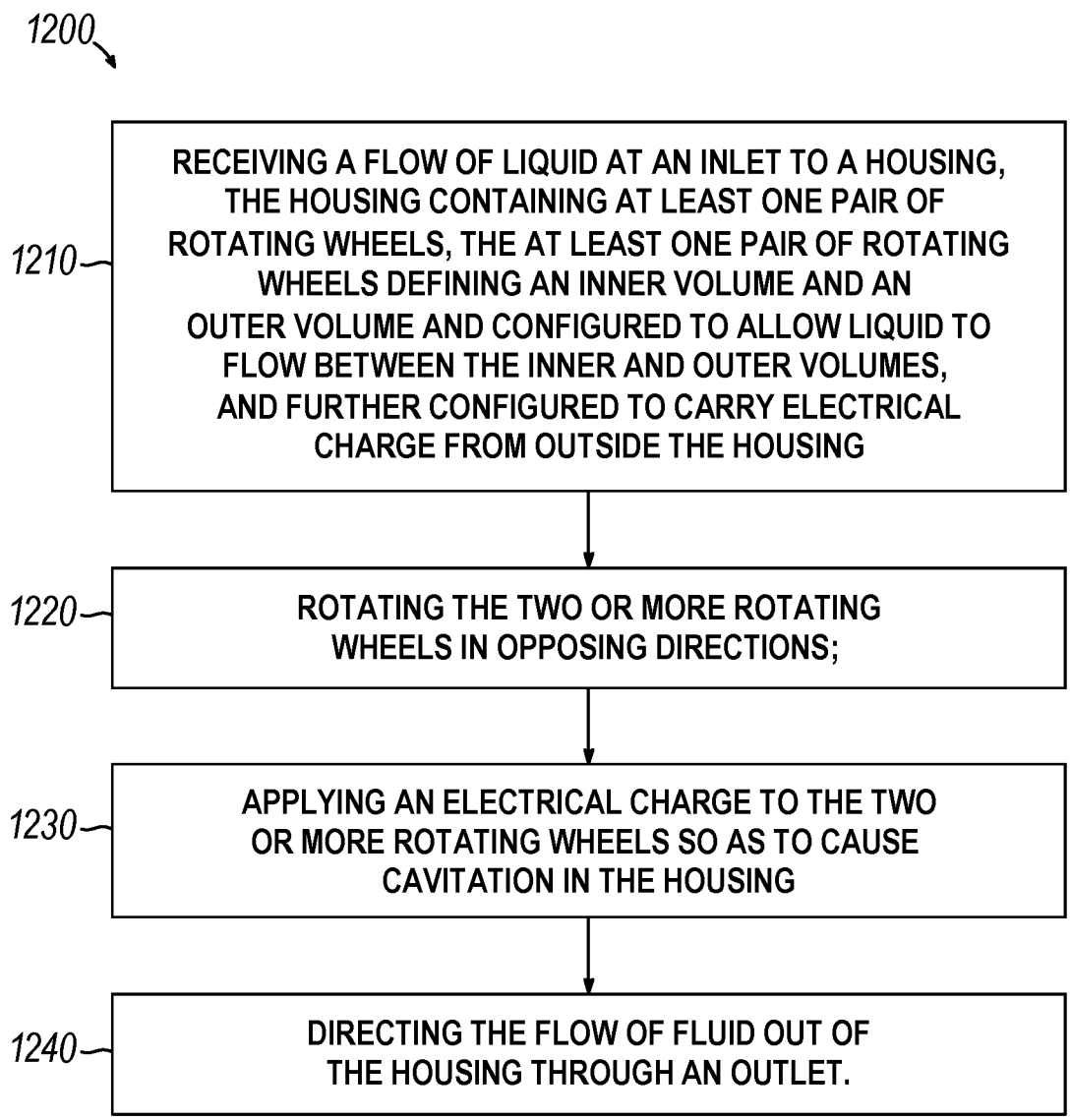
FIG. 11 shows a method embodiment under the present disclosure.

A method 1200 of causing cavitation under the present disclosure is shown in FIG. 11. At step 1210, a flow of liquid is received at an inlet to a housing, the housing containing at least one pair of rotating wheels, the at least one pair of rotating wheels defining an inner volume and an outer volume and configured to allow liquid to flow between the inner and outer volumes, and further configured to carry electrical charge from outside the housing. At step 1220, the two or more rotating wheels are rotated. At step 1230, an electrical charge is applied to the two or more rotating wheels so as to cause cavitation in the housing. At step 1240, the flow of fluid is directed out of the housing through an outlet.

Abbreviations and Defined Terms

To assist in understanding the scope and content of this written description and the appended claims, a select few terms are defined directly below. Unless defined otherwise, all technical and scientific terms used herein have the same meaning as commonly understood by one of ordinary skill in the art to which the present disclosure pertains.

The term "influent" refers to any "liquid under process" and these terms can be used interchangeably. Although a liquid may change throughout a liquid treatment process (undergoing filtration, cavitation, and other changes or processes), the liquid throughout the whole system can be referred to as "influent" or "liquid under process." The present disclosure is not limited to any particular type of liquid or fluid.

The terms "approximately," "about," and "substantially," as used herein, represent an amount or condition close to the specific stated amount or condition that still performs a desired function or achieves a desired result. For example, the terms "approximately," "about," and "substantially" may refer to an amount or condition that deviates by less than 10%, or by less than 5%, or by less than 1%, or by less than 0.1%, or by less than 0.01% from a specifically stated amount or condition.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or embodiments includes a specific reference to one or more embodiments thereof, and vice versa, and is intended to provide illustrative examples without limiting the scope of the present disclosure, which is indicated by the appended claims rather than by the present description.

As used in the specification, a word appearing in the singular encompasses its plural counterpart, and a word appearing in the plural encompasses its singular counterpart, unless implicitly or explicitly understood or stated otherwise. Thus, it will be noted that, as used in this specification and the appended claims, the singular forms "a," "an" and "the" include plural referents unless the context clearly dictates otherwise. For example, reference to a singular referent (e.g., "a widget") includes one, two, or more referents unless implicitly or explicitly understood or stated otherwise. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

CONCLUSION

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

It is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims. The terms and expressions which have been employed herein are used as terms of description and not of limitation, and there is no intention in the use of such terms and expressions of excluding any equivalents of the features shown and described or portions thereof, but it is recognized that various modifications are possible within the scope of the present disclosure. Thus, it should be understood that although the present disclosure has been specifically disclosed in part by preferred embodiments, exemplary embodiments, and optional features, modification and variation of the concepts herein disclosed may be resorted to by those skilled in the art, and such modifications and variations are considered to be within the scope of this present description.

It will also be appreciated that systems, devices, products, kits, methods, and/or processes, according to certain embodiments of the present disclosure may include, incorporate, or otherwise comprise properties or features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

All references cited in this application are hereby incorporated in their entireties by reference to the extent that they are not inconsistent with the disclosure in this application. It will be apparent to one of ordinary skill in the art that methods, devices, device elements, materials, procedures, and techniques other than those specifically described herein can be applied to the practice of the described embodiments as broadly disclosed herein without resort to undue experimentation. All art-known functional equivalents of methods, devices, device elements, materials, procedures, and techniques specifically described herein are intended to be encompassed by this present disclosure.

When a group of materials, compositions, components, or compounds is disclosed herein, it is understood that all individual members of those groups and all subgroups thereof are disclosed separately. When a Markush group or other grouping is used herein, all individual members of the group and all combinations and sub-combinations possible of the group are intended to be individually included in the disclosure.

The above-described embodiments are examples only. Alterations, modifications, and variations may be effected to the particular embodiments by those of skill in the art without departing from the scope of the description, which is defined solely by the appended claims.

What is claimed is:

1. A water treatment system for treating influent comprising:
   a gravity separator configured to cause high-density solids to fall out of suspension from the influent and low-density materials to coalesce and break from the influent;
   a particle strainer downstream of the gravity separator and configured strain solids out of the influent;
   a pump downstream of the particle strainer configured to provide sufficient energy to push the influent through the water treatment system;

a multi-phase reaction (MPR) processing system downstream of the pump, the MPR processing system comprising;
   a plurality of shafts configured to be rotated by one or more motors, the plurality of shafts configured to receive an electrical current from one or more power supplies;
   a housing configured to receive the plurality of shafts therethrough at distal ends, the housing comprising an inlet configured to receive the influent from the pump and an outlet for discharging the influent; and
   a plurality of disks within the housing, each of the plurality of disks connected to one of the plurality of shafts and configured to be rotated thereby, the plurality of disks configured to face each other and define an inner and outer volume within the housing such that the influent may pass between the inner and outer volumes, each of the plurality of disks comprising one or more extensions extending from the respective disk toward the other disk;
   wherein when the plurality of shafts receive the electrical current an electrical potential is created between the plurality of disks such that rotating the disks creates cavitation in the influent;
   an electro-chemical cell downstream of the MPR processing system and configured to provide a catalytic reaction within the influent to convert chlorine ions into free chorine and chlorine dioxide; and
   a filtration system downstream of the electro-chemical cell configured to remove suspended solids from the influent.

2. The water treatment system of claim 1 further comprising a holding tank and a second pump between the electro-chemical cell and the filtration system, the holding tank configured to store influent from the electro-chemical cell and the second pump configured to provide energy for the influent to pass through the filtration system.

3. The water treatment system of claim 1 further comprising a second pump downstream of the filtration system.

4. The water treatment system of claim 1 wherein the water treatment system comprises at least a portion of a desalination system.

* * * * *